(12) United States Patent
Kanagala et al.

(10) Patent No.: US 8,164,441 B2
(45) Date of Patent: Apr. 24, 2012

(54) GEOGRAPHICALLY AGNOSTIC WIRELESS DATA COMMUNICATION SYSTEM HAVING WIRELESS DEVICES

(75) Inventors: Sameer Kanagala, San Jose, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 858 days.

(21) Appl. No.: 12/146,300

(22) Filed: Jun. 25, 2008

(65) Prior Publication Data
US 2009/0322551 A1 Dec. 31, 2009

(51) Int. Cl.
*G08B 1/08* (2006.01)
*G06Q 20/00* (2012.01)
*G06Q 50/00* (2012.01)
*H04W 24/00* (2009.01)

(52) U.S. Cl. .......... 340/539.13; 340/539.1; 340/539.11; 705/338; 705/328; 455/456.1; 455/456.6

(58) Field of Classification Search .............. 340/539.1, 340/539.11, 539.13; 705/338, 328; 455/456.1, 455/456.6
See application file for complete search history.

(56) References Cited

U.S. PATENT DOCUMENTS

| | | | |
|---|---|---|---|
| 7,323,977 B2 * | 1/2008 | Kodukula et al. | 340/505 |
| 2004/0100932 A1 * | 5/2004 | Shiota et al. | 370/338 |
| 2004/0223477 A1 * | 11/2004 | Iwasaki et al. | 370/338 |
| 2006/0030338 A1 * | 2/2006 | Harken et al. | 455/456.6 |
| 2006/0145855 A1 * | 7/2006 | Diorio et al. | 340/572.1 |
| 2007/0139223 A1 * | 6/2007 | Bedenko | 340/988 |
| 2007/0142055 A1 * | 6/2007 | Toivanen et al. | 455/450 |
| 2007/0236729 A1 * | 10/2007 | Yoda | 358/1.15 |
| 2008/0004039 A1 * | 1/2008 | Ober et al. | 455/456.1 |
| 2008/0084310 A1 * | 4/2008 | Nikitin et al. | 340/572.7 |
| 2009/0273474 A1 * | 11/2009 | Nonaka | 340/572.5 |

* cited by examiner

*Primary Examiner* — Brent Swarthout
*Assistant Examiner* — Andrew Bee (57) ABSTRACT

A wireless data communication system suitable for use as a radio frequency (RF) locationing or presence detection system includes at least one wireless access device and at least one active RF tag corresponding to an item or asset of interest. The wireless access device is configured to transmit a locale message that conveys location-specific data corresponding to a geographic operating region of the wireless access device. The active RF tag receives the locale message, processes the location-specific data conveyed in the locale message, and configures itself in accordance with the location-specific data to support operation using a selected wireless data communication scheme. The selected scheme is compliant with the operating requirements of the geographic operating region in which the active RF tag resides.

4 Claims, 6 Drawing Sheets

GEOGRAPHICALLY AGNOSTIC WIRELESS DATA COMMUNICATION SYSTEM HAVING WIRELESS DEVICES

TECHNICAL FIELD

Embodiments of the subject matter described herein relate generally to wireless data communication systems. More particularly, embodiments of the subject matter relate to systems having one or more active radio frequency (RF) tags or wireless devices that wirelessly communicate with one or more wireless access devices.

BACKGROUND

RF identification (RFID) systems are well known and the prior art includes different types of RFID systems, different applications for RFID systems, and different data communication protocols for RFID systems. RFID systems are commonly utilized for product tracking, product identification, and inventory control in manufacturing, warehouse, transportation, and retail environments. One type of RFID system includes two primary components: a reader (also known as an interrogator); and a passive tag (also known as a transponder). The tag is a miniature device that is capable of responding, via an air channel, to an RF signal generated by the reader. The tag is configured to generate a reflected RF signal in response to the RF signal emitted from the reader. The reflected RF signal is modulated in a manner that conveys identification data back to the reader. The identification data can then be stored, processed, displayed, or transmitted by the reader as needed.

Another type of RFID system employs active RF tags configured to wirelessly communicate with a reader or wireless access device. In this type of system, an active RF tag includes an integrated power supply, such as a battery, a processor, memory, and an RF radio. The active RF tag periodically broadcasts (chirps) RF signals in an attempt to reach a nearby reader or wireless access device, where the RF signals convey data associated with the respective tag, which in turn is associated with a particular asset, package, item, or product. In practice, an active RF tag may function as a wireless client in a wireless data communication system, such as a wireless local area network (WLAN). In such an environment, the active RF tag can wirelessly communicate with one or more wireless access devices, which may be stand-alone wireless access points or wireless access ports that cooperate with one or more wireless switches located in the WLAN.

Due to their relatively high cost, active RF tags are typically used for tracking and/or locating relatively high valued assets, containers, packages, or items. For such applications, each active RF tag may be assigned a network identifier or address (such as a MAC address), which in turn is associated with a particular asset; the active RF tag is attached to, contained within, or integrated with the asset to enable tracking and locating. A network of wireless access devices in a tracking environment can be used to receive and process the RF signals emitted by the active RF tags. For example, if at least three access devices receive RF signals from one active RF tag, then triangulation techniques and received signal strength measurements can be used to pinpoint the physical location of the active RF tag and, therefore, the associated asset.

Product supply chains often require shipment of assets, containers, and packages on aircraft. Accordingly, active RF tags used to track such items may travel to different countries and geographical regions. Different countries and geographical regions may have different regulatory restrictions, guidelines, and requirements that govern wireless communication systems, including wireless systems that utilize wireless access devices, active RF tags, and the like. Wireless infrastructure equipment, such as access points and wireless switches, are typically subjected to an installation or initialization procedure whereby the equipment is configured for compliance with the particular geographic region. This approach, while suitable for "fixed" deployments where the equipment remains within the specified geographic region, can be cumbersome and time consuming for mobile equipment such as active RF tags, or for wireless access devices that might be installed on an aircraft.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

The subject matter described herein relates to a geographically agnostic wireless system that includes one or more wireless devices, such as active RF devices (tags). Most wireless equipment is designed to operate in multiple geographies, however, at any given time it is assumed that the equipment is compatible with a specific geographical region. This characteristic can be problematic in aircraft deployments, because aircraft can depart and arrive in different locations during the course of a single day. The same problems may be present in railroad, bus, geographically distributed data center, and other deployments. To address this problem, the techniques and technologies described herein leverage location data corresponding to the current geographical location of the wireless system. That location data is used to configure the wireless equipment for compatibility with the rules of the local regulatory regime to ensure compliance. Compliance with aircraft regulations is particularly important to ensure that wireless devices do not interfere with communications, navigation, and locating systems, such as radar systems.

The system described herein may cooperate with a global positioning system (GPS), either embedded in the wireless infrastructure equipment or standalone, which provides location information to the wireless access devices in the system. The access devices use this information to tailor the frequency band (or bands) and channel (or channels) for use in the particular geographical region. This location information is also forwarded to other components in the wireless system, such as active RF tags. In turn, the active RF tags automatically configure themselves for compliance with the operating requirements of the geographical region. Accordingly, for an aircraft implementation, the system will adjust its wireless operating parameters in accordance with its current location.

Figure 1:
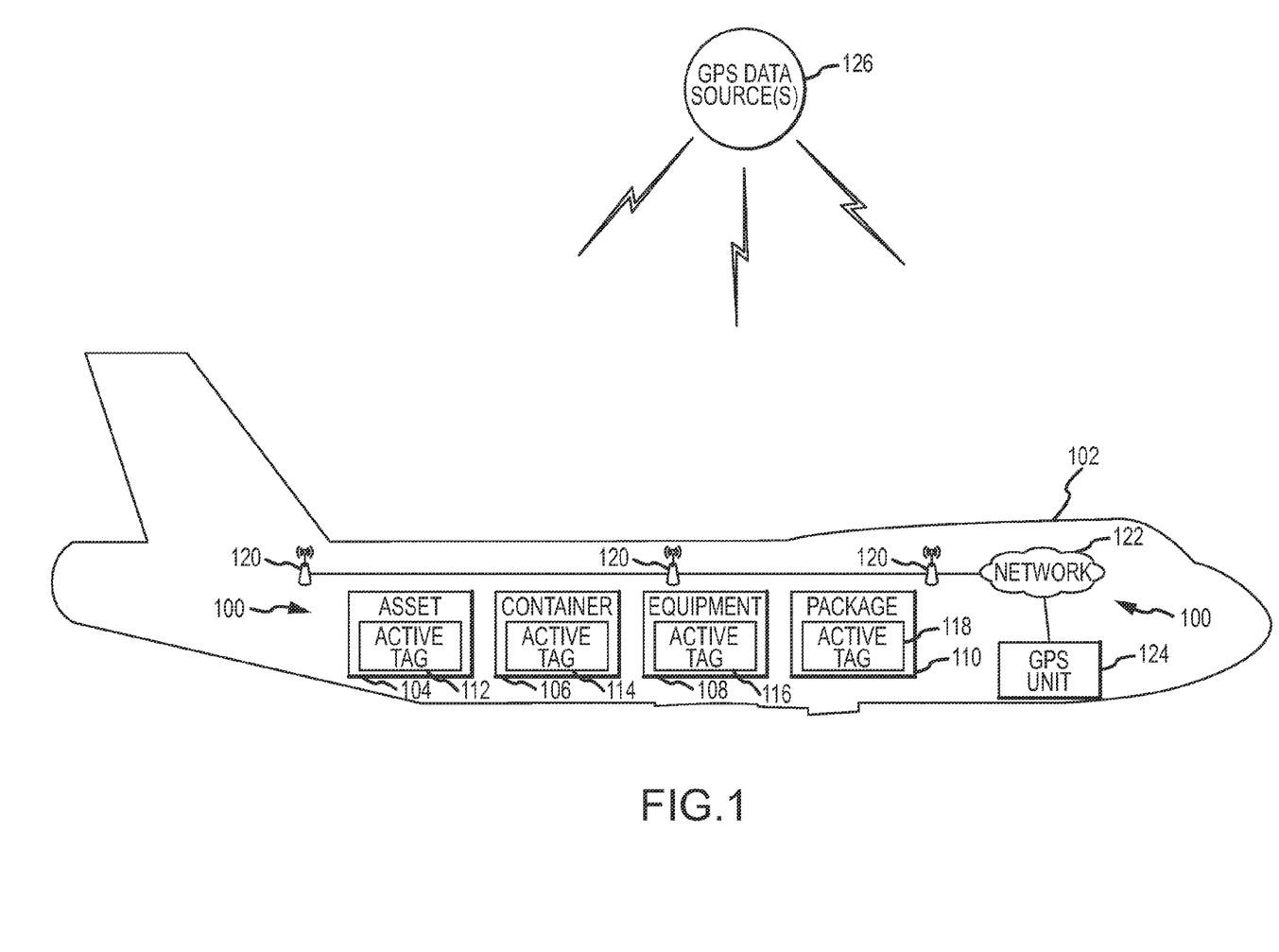
FIG. 1 is a schematic representation of an embodiment of a wireless data communication system onboard an aircraft.

FIG. 1 is a schematic representation of an embodiment of a wireless data communication system 100 onboard an aircraft 102. Although an aircraft deployment is described herein, alternate embodiments of system 100 may be utilized in other environments and for other applications where it might be desirable to accommodate wireless devices (e.g., active RF tags). This particular embodiment of system 100 is suitably configured to interact with active RF tags associated with various items of interest, which may include, without limitation: at least one asset 104; at least one container 106; at least one piece of equipment 108; and/or at least one package 110. For the sake of brevity, conventional techniques related to RFID systems, active RF tags, and other functional aspects of the systems (and the individual operating components of the systems) may not be described in detail herein.

Although not a requirement, system 100 uses one active RF tag per item of interest. Accordingly, asset 104 has an associated active RF tag 112, container 106 has an associated active RF tag 114, equipment 108 has an associated active RF tag 116, and package 110 has an associated active RF tag 118. Each active RF tag in system 100 may be affixed to, enclosed within, packaged with, integrated into, or otherwise maintained in close physical proximity to its corresponding item of interest. The physical packaging and form factor of active RF tags used with system 100 may vary according to the particular deployment, item type, supplier, and/or manufacturer. Indeed, the overall shape, size, hardware, and packaging characteristics of active RF tags used with system 100 may be similar to conventional active RF tags available from manufacturers such as AeroScout, Ekahau, and Newbury Networks.

The illustrated embodiment of wireless data communication system 100 includes, without limitation: one or more wireless access devices 120; a network architecture 122; and a component that receives and processes location or position information, depicted here as a GPS unit 124. For the sake of brevity, conventional techniques related to WLANs, wireless access devices, wireless data communication, GPSs, and network control may not be described in detail herein. In practice, wireless access devices 120 and GPS unit 124 are all coupled to network architecture 122 to facilitate the exchange of information. FIG. 1 depicts an implementation where wireless access devices 120 are all onboard aircraft devices. In other deployments, system 100 can cooperate with one or more wireless access devices (not shown) that are not located on aircraft 102, for example, wireless access devices located at the aircraft terminal, wireless access devices located near the cargo area, handheld wireless access devices, or the like.

In certain embodiments, a wireless access device can be realized as a wireless access port, which is a "thin" device that relies on the network intelligence and management functions provided by a wireless switch in network architecture 122. In other embodiments, a wireless access device can be realized as a wireless access point, which is a "thick" device having the network intelligence and processing power integrated therein. Thus, a wireless access point need not rely upon a wireless switch for operation. Wireless access ports having conventional features that can be incorporated into wireless access devices 120, and wireless access points having conventional features that can be incorporated into wireless access devices 120, are available from Motorola, Inc. Briefly, a wireless access device 120 as described herein is suitably configured to transmit and receive data from wireless clients (including active RF tags) over wireless links. Once that data is captured by the wireless access device 120, the data can be processed for communication within network architecture 122 and/or for handling by the host aircraft 102. For example, the data can be encapsulated into a packet format compliant with a suitable data communication protocol.

As described in more detail herein, a wireless access device 120 is suitably configured to transmit locale messages (e.g., beacons) to the active RF tags to support operation of system 100 in compliance with the current geographical operating region. A locale message contains location-specific data for the transmitting wireless access device 120, and the location-specific data corresponds to the current geographical operating region of the wireless access device 120. The receiving active RF tag uses that location-specific data to select an appropriate wireless data communication scheme. In certain embodiments, GPS unit 124 is used to obtain GPS data, which can then be processed by one or components in network architecture 122 or routed to wireless access devices 120 for processing. In other embodiments, wireless access devices 120 include embedded GPS units that are suitably configured to obtain GPS data. Accordingly, GPS unit 124 and/or wireless access devices 120 may receive GPS data from one or more GPS data sources 126. In practice, a GPS data source 126 may be realized as a GPS satellite, a GPS transmission tower, or the like. Thus, GPS unit 124 and/or wireless access devices 120 can derive, calculate, or otherwise obtain their current position using GPS data, latitude and longitude data, relative position data, etc. In alternate embodiments, GPS unit 124 and/or wireless access devices 120 may receive latitude and longitude data that has been manually keyed in or otherwise entered into system 100. In such alternate embodiments, GPS data need not be automatically received from GPS data sources 126.

Figure 2:
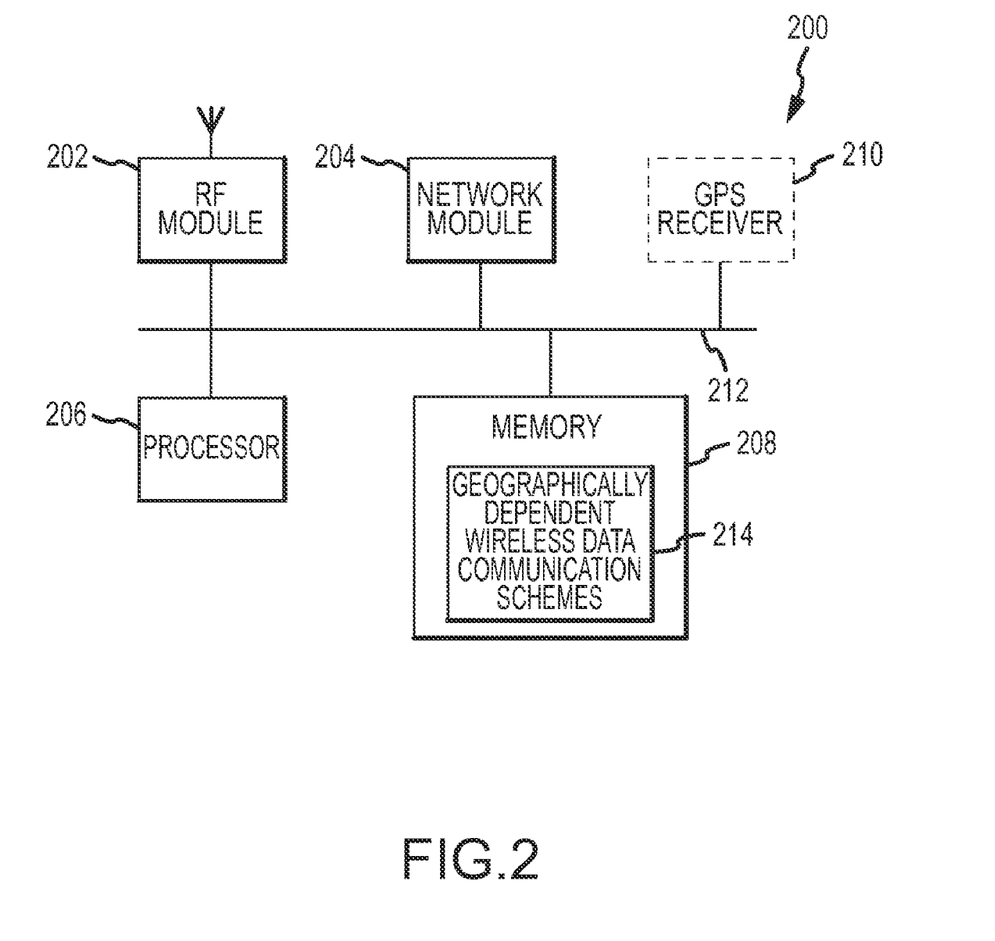
FIG. 2 is a schematic representation of an embodiment of a wireless access device suitable for use in the system shown in FIG. 1.

FIG. 2 is a schematic representation of an embodiment of a wireless access device 200 suitable for use in the system shown in FIG. 1. Wireless access device 200 generally includes, without limitation: an RF module 202; a network module 204; a processor 206; and an appropriate amount of memory 208. Certain embodiments of wireless access device 200 may also include an embedded GPS receiver 210. These and other elements of wireless access device 200 may be interconnected together using a bus 212 or any suitable interconnection arrangement. Such interconnection facilitates communication between the various elements of wireless access device 200. A practical embodiment of wireless access device 200 will include additional components and elements configured to support known or conventional operating features that need not be described in detail herein.

RF module 202, which includes a receiver and a transmitter (or a transceiver), is configured to communicate with wireless clients, including active RF tags, via a wireless data communication link. RF module 202 may cooperate with a suitably configured RF antenna arrangement to support the particular wireless communication protocol. In exemplary embodiments, RF module 202 is configured to support WLAN connectivity in compliance with established IEEE Standards, such as 802.11 (any suitable variant). Of course, RF module 202 may be configured to support alternate or additional wireless data communication protocols, including future variations of 802.11. In yet other embodiments, RF module 202 could be configured to support other wireless data communication schemes such as BLUETOOTH®; ZigBee (and other variants of the IEEE 802.15 protocol); IEEE 802.16 (WiMAX or any other variation); Direct Sequence Spread Spectrum; Frequency Hopping Spread Spectrum; cellular/wireless/cordless telecommunication protocols; paging network protocols; wireless hospital or health care facility network protocols such as those operating in the WMTS bands; GPRS; and proprietary wireless data communication protocols such as variants of Wireless USB.

Network module 204 generally represents the hardware, software, firmware, processing logic, and/or other components of wireless access device 200 that enable bi-directional communication between wireless access device 200 and network components to which wireless access device 200 is connected. For example, network module 204 may be configured to support 10/100/1000 Mbps Ethernet LAN traffic. Referring to FIG. 1 as an example, network module 204 is suitably configured to transmit data to components in network architecture 122, and to receive data from components in network architecture 122, such as GPS unit 124. In a typical deployment, network module 204 provides an Ethernet interface such that wireless access device 200 can communicate with a conventional Ethernet-based network. In this regard, network module 204 may include a physical interface, such as 10/100/1000 Mbps, for connection to the network, and network module 204 (and/or processor 206) may handle Ethernet addressing for data packets sent from wireless access device 200.

Processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor 206 preferably includes processing logic that is configured to carry out the functions, techniques, and processing tasks associated with the operation of wireless access device 200. For example, processor 206 can control the transmission of locale messages, select a desired wireless data communication scheme from a plurality of available schemes, automatically configure wireless access device 200 for operation using the selected scheme, and the like.

Memory 208 may be implemented or realized with RAM memory, flash memory, ROM memory, EPROM memory, EEPROM memory, registers, a hard disk, a removable disk, a CD-ROM, or any other form of storage medium known in the art. In addition, memory 208 includes sufficient data storage capacity to support the operation of wireless access device 200. Memory 208 can be coupled to processor 206 such that processor 206 can read information from, and write information to, memory 208. In the alternative, memory 208 may be integral to processor 206. As an example, processor 206 and memory 208 may reside in a suitably configured ASIC.

Memory 208 may be used to store information related to any number of different geographically dependent wireless data communication schemes 214. The different schemes 214 correspond to different possible geographic operating regions for wireless access device 200. In this regard, a given scheme 214 will be compliant with the operating requirements of its respective geographic operating region. In practice, a wireless data communication scheme 214 may include, define, or specify any number of operating characteristics, parameters, features, and/or criteria to be used by wireless access device 200. For example, a scheme 214 may set forth a particular wireless protocol, operating frequency, operating frequency range (band), channel or channels, transmit power limits, modulation technique, listen-before-talk protocol, encryption protocol, authentication protocol, or the like.

Figure 3:
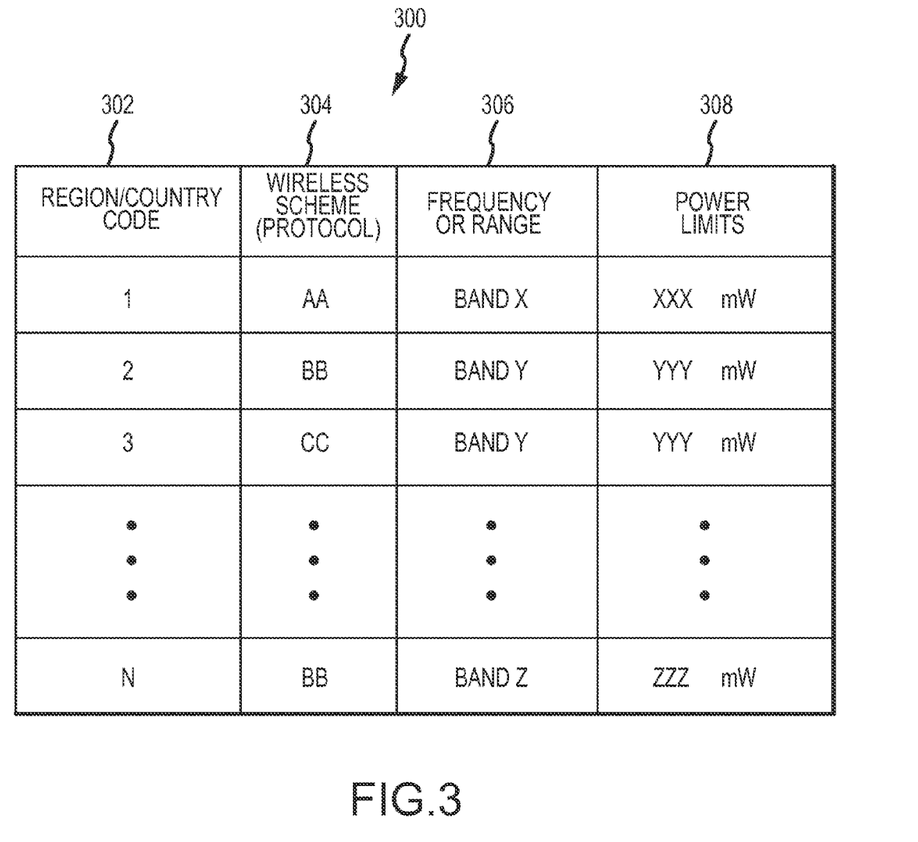
FIG. 3 is a diagram of an exemplary lookup table, which may be utilized by a wireless access device and/or an active RF tag.

Memory 208 may maintain wireless data communication schemes 214 in a suitably formatted lookup table. In this regard, FIG. 3 is a diagram of an exemplary lookup table 300, which may be utilized by wireless access device 200. This particular embodiment references a number (N) of different geographical operating regions by different region or country codes 302. For example, one country code may correspond to the United States, another country code may correspond to Japan, and another country code may correspond to Australia. In practice, a code may be a sequence of bits, a numerical value, an alphanumeric value, or the like. Lookup table 300 may include one or more entries for each region/country code 302, including, without limitation: a wireless scheme or protocol 304; a frequency or frequency range 306; or a power limit 308. A wireless access device can use the information contained in lookup table 300 to reconfigure itself for compliant operation in accordance with the requirements of one of the regions or countries included in lookup table 300.

Referring again to FIG. 2, certain embodiments of wireless access device 200 include an integrated GPS receiver 210 (or an equivalent component that can receive absolute or relative location or position data). As mentioned previously in the context of wireless data communication system 100, wireless access device 200 may employ GPS receiver 210 as a means for directly obtaining GPS data from GPS satellites or GPS towers, rather than relying on an external source for the GPS data. In practice, GPS receiver 210 is an optional element of wireless access device 200 because a separate GPS receiver or unit that communicates with wireless access device 200 could be deployed as an equivalent alternative.

Figure 4:
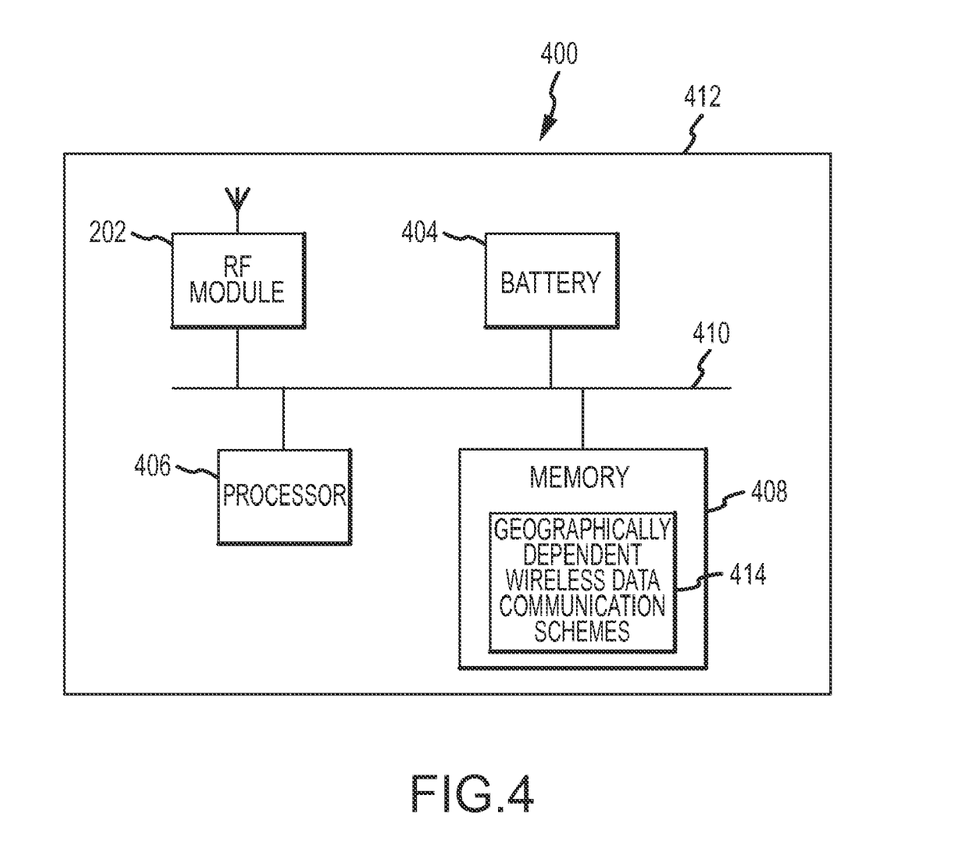
FIG. 4 is a schematic representation of an embodiment of an RF device suitable for use in the system shown in FIG. 1.

Wireless access device 200 cooperates and communicates with wireless RF devices, such as active RF tags, in the manner described in more detail below. FIG. 4 is a schematic representation of an embodiment of a wireless RF device 400 suitable for use in the system shown in FIG. 1. Although RF device 400 may be implemented in various form factors (e.g., an RFID tag, a wireless mobile device, an asset tag, a Wi-Fi enabled device), the following description refers to an embodiment where RF device 400 is an active RF tag. RF device 400 is suitably configured to support operation of the system in compliance with the particular operating requirements of the geographic region in which it resides.

RF device 400 generally includes, without limitation: an RF module 402; an internal power supply such as a battery 404; a processor 406; and an appropriate amount of memory 408. These and other elements of RF device 300 may be interconnected together using a bus 410 or any suitable interconnection arrangement. Such interconnection facilitates communication between the various elements of RF device 400. In practice, RF device 400 may be implemented as a system on a chip (SoC), i.e., realized using one integrated circuit chip. A practical embodiment of RF device 400 will include additional components and elements configured to support known or conventional operating features that need not be described in detail herein. RF device 400 will typically be realized as a self-contained component having a package housing 412 that encloses the elements mentioned above. Package housing 412 is relatively compact in size, and certain embodiments may be less than three inches long, less than two inches wide, and less than one inch thick.

RF module 402, which includes a receiver and a transmitter (or a transceiver), is configured to transmit and receive wireless signals to communicate with RFID readers, wireless access devices, or the like. RF module 402 may cooperate with a suitably configured RF antenna arrangement to support the particular wireless communication protocol. RF module 402 can be configured to support wireless connectivity using any of the techniques, protocols, and schemes mentioned above with reference to RF module 202 (see FIG. 2). In preferred embodiments, RF module 402 is compatible with IEEE Specification 802.11 (any suitable variant thereof). Moreover, some operating characteristics and/or configuration settings of RF module 402 may be adjustable or selectable for compliance with the operating requirements of different geographic regions. RF module 402 is suitably configured to receive locale messages, beacons, and other RF signals from one or more wireless access devices within the wireless data communication system.

Battery 404 is configured to provide operating power to RF device 400. A battery or a physically small battery pack is desirable due to the portable and self-contained form factor of RF device 400. Battery 404 may be realized as a disposable or rechargeable battery or battery pack. Battery 404 is suitably configured with voltage and current ratings that can support the different wireless data communication schemes for RF device 400.

Processor 406 may be implemented or realized as generally described above for processor 206 (FIG. 2). Processor 406 preferably includes processing logic that is configured to carry out the functions, techniques, and processing tasks associated with the operation of RF device 400. For example, processor 406 can process received locale messages, extract location-specific data from locale messages, select a wireless data communication scheme based on the location-specific data, reconfigure the operating characteristics and parameters of RF device 400 to support the selected scheme, and the like. Moreover, processor 406 may be suitably configured to support encryption and/or authentication schemes, which may be implemented to prevent spoofing (where an unwanted or unauthorized device attempts to communicate with RF device 400. The operating specifications and requirements of such encryption and/or authentication schemes may vary from one geographical region to another.

Memory 408 may be implemented or realized with RAM memory, flash memory, ROM memory, EPROM memory, EEPROM memory, registers, a hard disk, a removable disk, a CD-ROM, or any other form of storage medium known in the art. In addition, memory 408 includes sufficient data storage capacity to support the operation of RF device 400. Memory 408 can be coupled to processor 406 such that processor 406 can read information from, and write information to, memory 408. In the alternative, memory 408 may be integral to processor 406. As an example, processor 406 and memory 408 may reside in a suitably configured ASIC.

Memory 408 may be used to store information related to any number of different geographically dependent wireless data communication schemes 414, as described above with reference to wireless access device 200 (see FIG. 2). In this regard, memory 408 may maintain wireless data communication schemes 414 in a suitably formatted lookup table. For example, lookup table 300 (FIG. 3) may be utilized by RF device 400.

Wireless devices, active RF tags, and wireless access devices configured as described above can be utilized to manage transmissions in the wireless system. Access devices within the system broadcast locale messages that are used by the wireless devices to determine which wireless data communication scheme to select for compliance with the operating requirements of the geographic region in which the wireless devices are located. This automatic configuration technique enables wireless devices to be transported from one geographic region to another, even if the different regions have incompatible requirements, restrictions, rules, or regulations that govern wireless data communication.

It should be noted that the system may support different wireless communication modes, such as peer-to-peer communication, mesh network communication, or the like. For example, certain embodiments may support tag-to-tag wireless communication, which could be used to relay locale messages from one tag to another tag. As another example, certain embodiments may support wireless communication between access devices arranged in a mesh network architecture.

Figure 5:
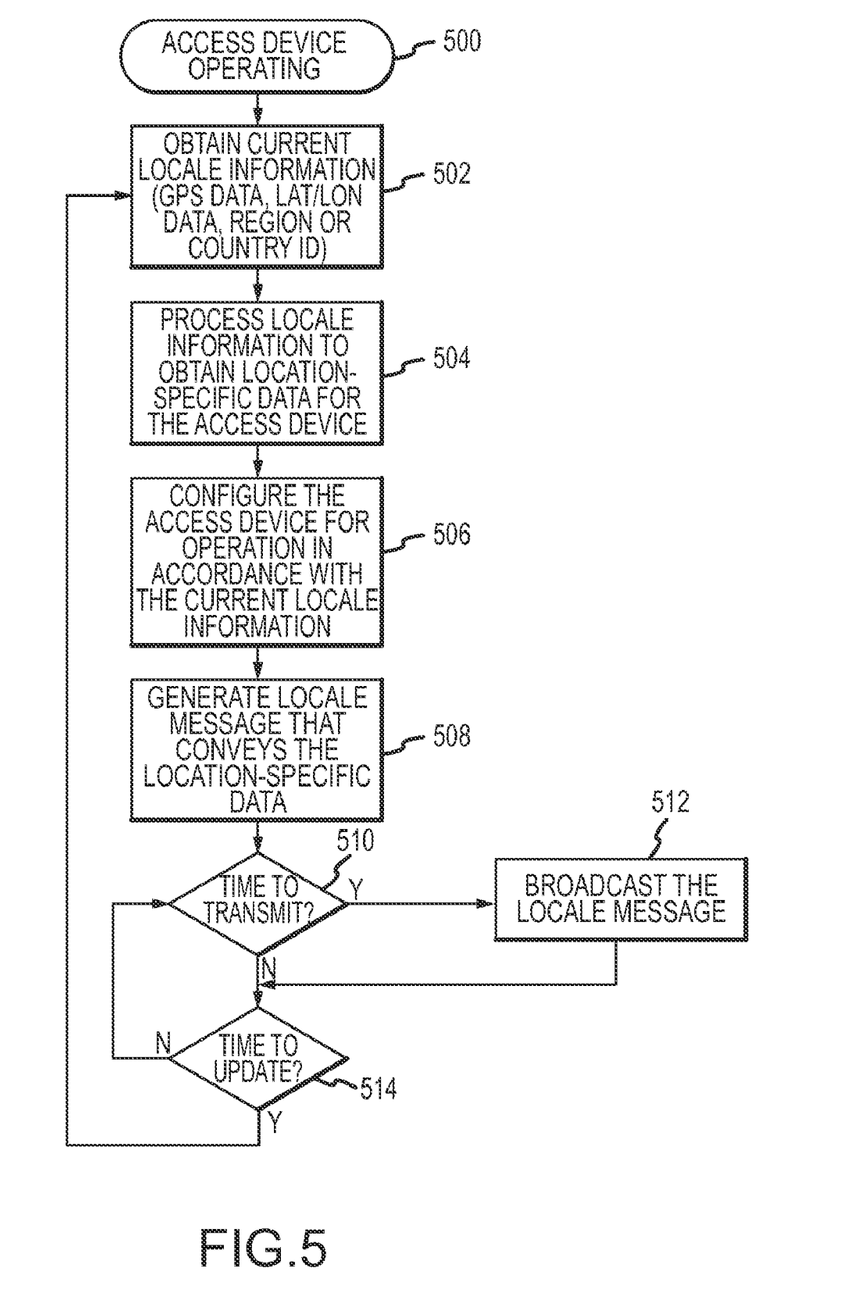
FIG. 5 is a flow chart that illustrates an embodiment of an access device operating process.
Figure 6:
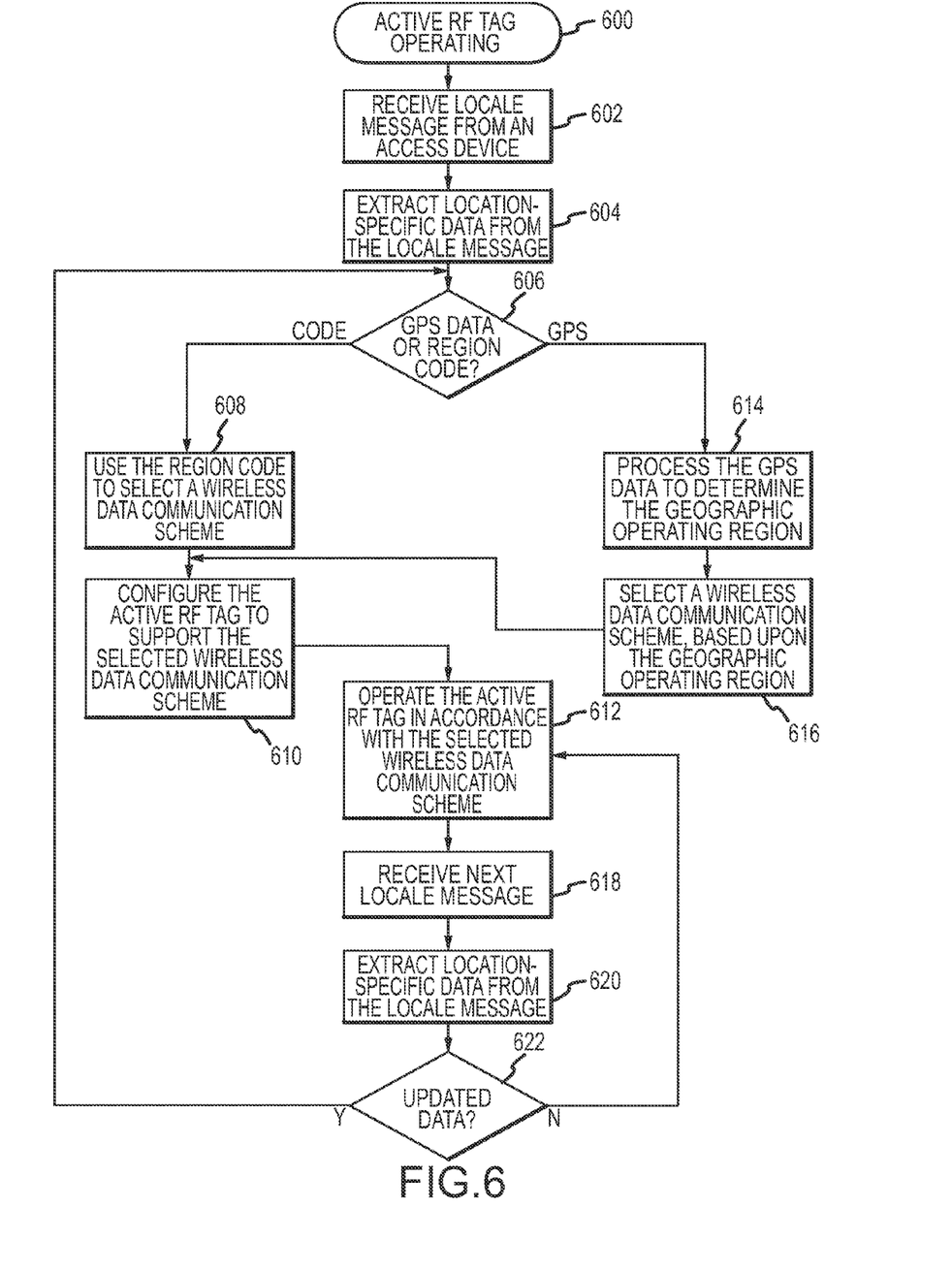
FIG. 6 is a flow chart that illustrates an embodiment of an active RF tag operating process.

One exemplary methodology will be explained with reference to FIG. 5 and FIG. 6. FIG. 5 is a flow chart that illustrates an embodiment of an access device operating process 500. The various tasks performed in connection with process 500 may be performed by software, hardware, firmware, or any combination thereof. For illustrative purposes, the following description process 500 may refer to elements mentioned above in connection with FIGS. 1-4. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Process 500 may begin with the access device obtaining current locale information corresponding to the geographic operating region of the wireless system and, in particular, the geographic operating region of the access device itself (task 502). The locale information may include, represent, convey, or indicate GPS data, latitude and longitude data, relative position data, an identification of the region, an identification of the country, or the like. In preferred embodiments, the locale information represents GPS data that may be received directly by the access device or provided to the access device by an external component or control unit. The GPS data indicates the current location of the wireless access device (with sufficient accuracy to enable the geographically agnostic operation described here).

The wireless access device can process the locale information (task 504) in an appropriate manner to obtain, generate, or retrieve location-specific data for the wireless access device. In certain embodiments, the location-specific data may be identical or equivalent to the locale information; for example, the location-specific data may include the GPS data. In other embodiments, the location-specific data may be calculated from, derived from, or otherwise associated with the locale information. For example, the location-specific data may include a country code or a region code corresponding to the GPS data. In other words, the locale information may indicate the location or position of the wireless access device using one reference system or domain, while the location-specific data may indicate the location or position of the wireless access device using another reference system or domain—task 504 may be utilized as a transformation or translation between the reference systems/domains.

In some system deployments, the wireless access device itself may travel from one geographic operating region to another. Accordingly, it may be necessary for process 500 to configure the wireless access device (task 506) for operation in accordance with a wireless data communication scheme that is compliant with the particular requirements of the current geographic operating region. As mentioned above, the locale information and/or the location-specific data may be utilized to configure the wireless access device in an appropriate manner. Once it is so configured, the wireless access device can continue operating in accordance with the selected wireless data communication scheme.

Process 500 also generates a suitably formatted locale message that conveys the location-specific data (task 508). As mentioned above, the location-specific data is influenced by the locale information obtained during task 502. The locale message may be formatted for broadcasting or transmission by the wireless access device in a beacon. In practice, the locale message is formatted and arranged such that it can be received and processed by active RF tags within range of the wireless access device.

The embodiment described here assumes that locale messages are sent according to a time schedule (e.g., sent periodically in predetermined time slots). Accordingly, if it is time to transmit (query task 510), then the wireless access device will broadcast the locale message (task 512) to active RF tags within its range. If not, then process 500 may check whether the locale information has been updated or whether it is time to check for updated locale information (query task 514). If updating is not required, then process 500 may return to query task 510 to continue monitoring for the next locale message transmit time. If updating is required, then process 500 may return to task 502 to obtain the updated locale information and repeat the procedure as described above. The loop defined by tasks 510, 512, and 514 is carried out to repeatedly broadcast the same locale message at the designated times, until the locale information is updated. This allows process 500 to respond to movement of the wireless access device across geographical boundaries, and allows the wireless access device to automatically adapt to its current geographic operating region to support operation using an appropriate wireless data communication scheme.

The location-specific data conveyed in locale messages may influence one or more functional parameters of active RF tags that receive the locale messages. For example, the location-specific data might influence the operating frequency or frequency range of active RF tags within range of the wireless access device. As another example, the location-specific data might influence the operating power limits of active RF tags within range of the wireless access device. In this regard, FIG. 6 is a flow chart that illustrates an embodiment of an active RF tag operating process 600, which may be carried out by the active RF tags within the wireless system. The various tasks performed in connection with process 600 may be performed by software, hardware, firmware, or any combination thereof. For illustrative purposes, the following description process 600 may refer to elements mentioned above in connection with FIGS. 1-4. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Process 600 may begin when an active RF tag receives a locale message that originates from a wireless access device in the wireless system (task 602). In practice, the active RF tag may be designed to scan all available channels, frequencies, and/or bands for locale messages or associated beacons. Scanning in this manner is desirable to ensure that the active RF tag will be able to receive locale messages that might be transmitted in accordance with different geographically dependent protocols or schemes. Upon receipt, the active RF tag can process the locale message in an appropriate manner to extract the location-specific data from the locale message (task 604). The illustrated embodiment assumes that the location-specific data includes GPS data, a country code, and/or a region code, which indicates a location of at least one wireless access device in the system. Alternatively or additionally, the location-specific data may include latitude and longitude data, or any suitably formatted position or location data.

If the location-specific data includes a country or region code (query task 606), then process 600 can use the code to select one of a plurality of geographically-dependent wireless data communication schemes for use as the currently designated scheme (task 608). Referring to FIG. 3, the active RF tag may use the code during a table lookup operation that returns the parameters, settings, and/or configuration data for the currently designated scheme. In addition, the active RF tag may configure itself in accordance with the location-specific data to support operation using the currently designated scheme (task 610). As described above, the currently designated scheme is selected for compliance with the particular operating requirements of the geographic operating region in which the active RF tag resides. Thereafter, the active RF tag can be operated in accordance with the selected wireless data communication scheme (task 612).

Referring again to query task 606, if the location-specific data includes GPS data, then the active RF tag may process the GPS data in an appropriate manner to determine the geographic operating region corresponding to the GPS data (task 614). In practice, the active RF tag may be suitably configured to analyze the GPS data and derive a corresponding country code, region code, or other identifier of the geographic operating region. Next, process 600 can select one of a plurality of geographically-dependent wireless data communication schemes for use as the currently designated scheme (task 616). The selection made during task 616 will be based upon or influenced by the geographic operating region corresponding to the received GPS data. Following task 616, process 600 may perform task 610 and task 612 as described above.

This implementation of process 600 assumes that the active RF tag can move between different geographic operating regions. Moreover, process 600 assumes that the active RF tag is capable of receiving locale messages periodically, according to a schedule, or at any time during operation. In this regard, when the active RF tag receives the next locale message (task 618) it will extract the location-specific data conveyed in that locale message (task 620). If the newly extracted location-specific data represents updated data (query task 622), then process 600 returns to query task 606 such that the active RF tag can be reconfigured (if needed) to support a different wireless data communication scheme. If, however, the newly extracted location-specific data does not represent updated data, then process 600 may return to task 612 and continue operating the active RF tag in accordance with the currently selected wireless data communication scheme. Thus, the loop defined by tasks 612, 618, 620, and 622 represents continued operation of the active RF tag using the selected wireless data communication scheme, until it receives updated location-specific data that prompts reconfiguration and selection of a different scheme.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing transmissions in a wireless system having a wireless active radio frequency identification (RFID) tag device and a wireless access device, the method comprising:
   obtaining location-specific global positioning system (GPS) data at the wireless access device;
   generating, at the wireless access device, a locale message that conveys the GPS data; the wireless active RFID tag device receiving the locale message from the wireless access device, the locale message conveying the GPS data that indicates a location of the wireless access device;
   extracting, at the wireless active RFID tag device, the location-specific GPS data from the locale message;
   processing the GPS data with the wireless active RFID tag device;
   selecting, at the wireless active RFID tag device, one of a plurality of geographically-dependent wireless data communication schemes, wherein the selecting step is based on and determined by the GPS data and selects a wireless data communication scheme that is compliant with requirements of a geographic operating region of the wireless access device, and wherein the wireless data communication scheme specifies an operating frequency or frequency range and an operating power limit for the wireless active RFID tag device; and
   operating the wireless active RFID tag device in accordance with the selected wireless data communication scheme.

2. The method of claim 1, wherein the location-specific GPS data comprises latitude and longitude data that indicates a location of the at least one wireless access device.

3. A wireless data communication system comprising:
   a global positioning system (GPS) receiver configured to obtain GPS data and calculate latitude and longitude data using the GPS data;
   a wireless access device configured to receive the latitude and longitude data from the GPS receiver and transmit a locale message that conveys the latitude and longitude data, which indicates a location of the wireless access device; and
   an active radio frequency identification (RFID) device configured to:
     receive the locale message;
     process the latitude and longitude data conveyed in the locale message;
     select one of a plurality of different geographically-dependent wireless data communication schemes for use as a selected wireless data communication scheme that is compliant with requirements of the location of the wireless access device, wherein the selected wireless data communication scheme is based on and determined by the latitude and longitude data; and
     configure itself in accordance with the latitude and longitude data to support operation using the selected wireless data communication scheme.

4. The wireless data communication system of claim 3, wherein the wireless access device is configured to automatically adapt to the location of the wireless access device to support operation using the selected wireless data communication scheme.

* * * * *